United States Patent [19]

Arnold

[11] Patent Number: 4,861,986
[45] Date of Patent: Aug. 29, 1989

[54] TRACER INJECTION METHOD

[75] Inventor: Dan M. Arnold, Houston, Tex.

[73] Assignee: Halliburton Logging Services, Inc., Houston, Tex.

[21] Appl. No.: 164,670

[22] Filed: Mar. 7, 1988

[51] Int. Cl.$^4$ .............................................. G01N 5/04
[52] U.S. Cl. ..................................... 250/260; 73/155; 250/259; 250/266
[58] Field of Search ............... 250/260, 259, 257, 256, 250/265, 266; 73/155, 861.05

[56] References Cited

U.S. PATENT DOCUMENTS

| Re. 27,272 | 1/1972 | Young | 250/260 |
|---|---|---|---|
| 3,248,540 | 4/1966 | Youmans | 250/260 |
| 3,255,347 | 6/1966 | Cobb et al. | 250/260 |
| 3,395,277 | 7/1968 | Mayer, Jr. et al. | 250/260 |
| 3,784,828 | 1/1974 | Hayes | 250/260 |
| 4,007,366 | 2/1977 | Wiley et al. | 250/260 |
| 4,032,778 | 6/1977 | Paap et al. | 250/266 |
| 4,035,640 | 7/1977 | Arnold et al. | 250/266 |
| 4,166,215 | 8/1979 | Anderson | 250/260 |
| 4,166,216 | 8/1979 | Cubberly, Jr. | 250/260 |
| 4,223,727 | 9/1980 | Sustek, Jr. et al. | 250/260 |
| 4,233,508 | 11/1980 | Arnold | 250/266 |
| 4,622,463 | 11/1986 | Hill | 250/260 |

FOREIGN PATENT DOCUMENTS 8300743 3/1983 PCT Int'l Appl. ................. 250/260

Primary Examiner—Janice A. Howell
Assistant Examiner—William F. Rauchholz
Attorney, Agent, or Firm—William J. Beard

[57] ABSTRACT

A tracer injection method is set forth and is practiced by using spaced end located injectors on a sonde having spaced detectors along the length of the sonde. The injectors inject radioactive isotopes which are distinguishable from one another at the detectors. The method contemplates simultaneous injection of different isotopes, making measurements to determine fluid flow velocity in the casing, and selecting peaks to obtain measurements of the fluid flow velocity in leaks through the casing into external channels along the casing.

15 Claims, 3 Drawing Sheets

FIG. 3
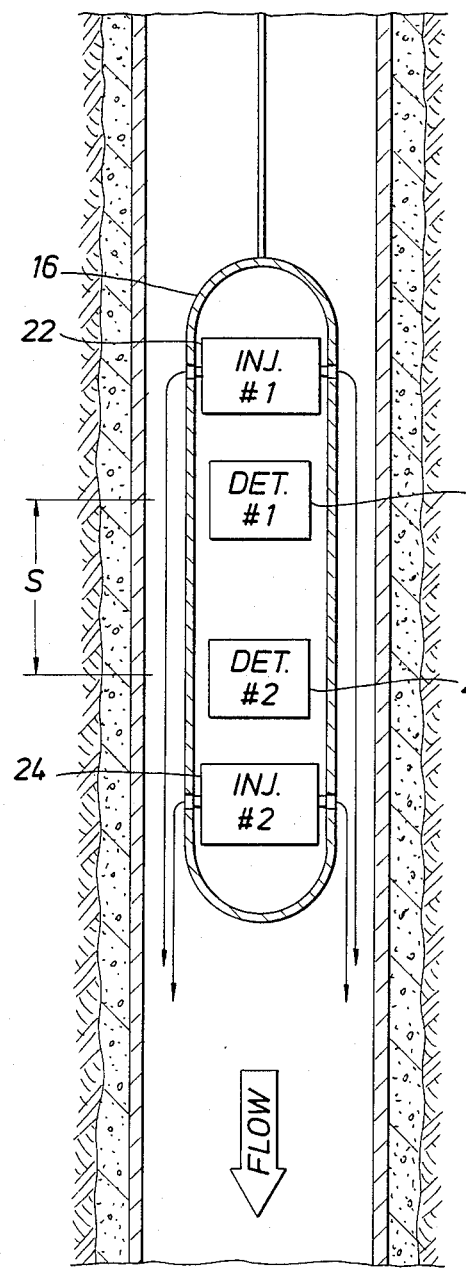
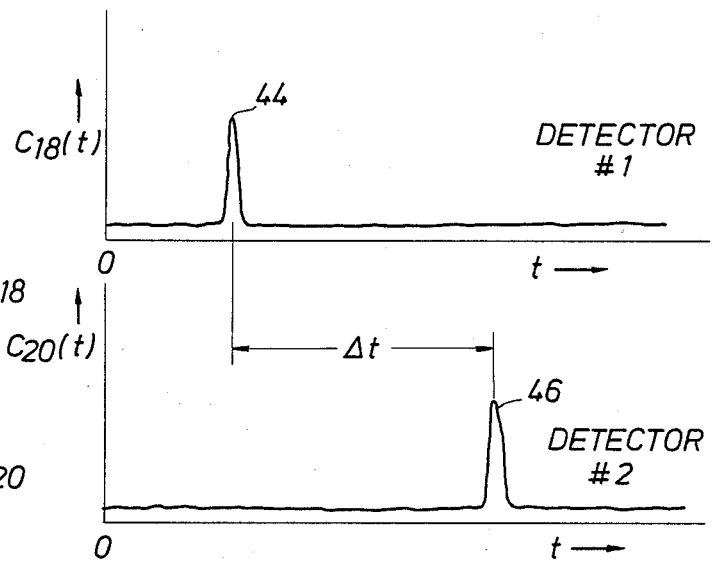
FIG. 4

TRACER INJECTION METHOD

BACKGROUND OF THE DISCLOSURE

This disclosure is directed to flow measurement within a borehole and in particular within a cased borehole where there is a suspicion that the casing has a leak creating flow on the exterior.

It is important to measure flow velocity in a well and in particular in a cased well where there is suspicion of leaking through the casing and drainage into adjacent formations. The present method also contemplates measurement of flow to determine the direction of flow, the velocity, all within the casing, and also flow on the exterior. When a casing is first installed in a well, it is normally cemented in place so that casing integrity is assured. Over a period of time, leaks may be formed through the casing. Indeed, it is possible for a well to leak through the casing, through the cement, and along the well (upwardly or downwardly) to a nearby formation which may accept the fluid flow. The present method is a procedure which first tests the simple situation of flow in the well (assuming no leaks), and determines the direction of flow and actual velocity. In a more sophisticated approach, the present method also measures flow velocity in the well, the leakage fluid flow velocity on the exterior of the casing and cement and the direction of each flow. Remedial treatment steps can be undertaken to plug the leak and thereby prevent leakage to the exterior. This avoids potential pollution flow from a producing well along an unintended pathway into artesian formations which may poison formations intended to be isolated from well production fluids. This procedure protects isolated formations from the invasion of production fluids. The production fluid may include a substantial portion of salt water. Where the well penetrates an artesian sand having only pure water, it is highly detrimental to that formation if salt water leaks into it.

Because of the pressure differentials that may prevail in various formations, leaks in well bore casing can be detrimental to hydrocarbon reservoirs. Water channeling through casing and cement leaks are detrimental to optimum production.

The present method contemplates the use of first and second tracer fluids which are injected into the well. They are radioactive tracer isotopes emitting gamma radiation. While in one procedure they can be identical isotopes, a greater range of testing can be accomplished through the use of different radioactive isotopes emitting gamma radiation of distinctly different energies. It is desirable that the isotopes be different in the sense that passage of the two different isotopes can be distinguished by suitable gamma ray detectors. Two spaced detectors are included in a sonde which carries two separate radioactive isotope injectors located at opposite ends of the sonde. If the isotopes are different, the two detectors can separately identify passage of the two isotopes as for instance by spectrum stripping, spectrum fitting, or by other known and suitable procedures. One suitable spectroscopic technique is set forth in U.S. Pat. No. 4,035,640.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 3 is a view similar to FIG. 1 for measuring flow velocity where the flow is downwardly within the casing;

FIG. 4 shows output signals obtained from the detectors for indicating downward flow velocity;

DESCRIPTION OF THE PREFERRED EMBODIMENT

Figure 1:
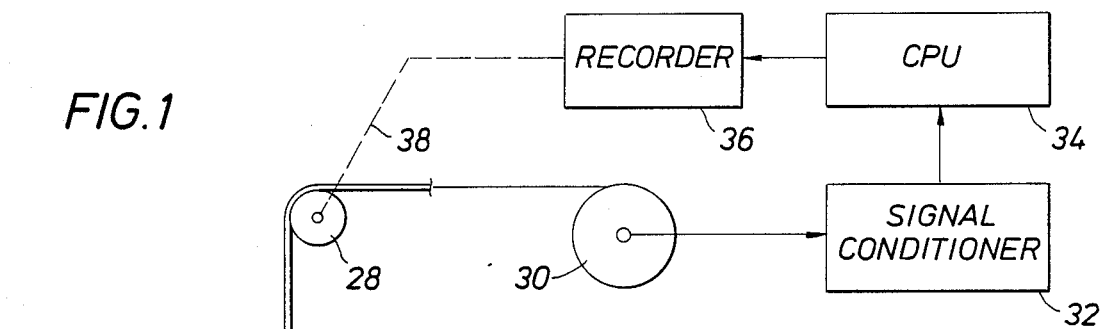
FIG. 1 shows a sonde supported in a cased well borehole having first and second gamma ray detectors and first and second injectors for determining flow velocity within the casing in an upward direction.

Attention is first directed to FIG. 1 of the drawings where certain equipment will be described before setting forth the method of the present apparatus. In FIG. 1, the numeral 10 identifies a well which is constructed with a casing 12 along the well 10. The casing 12 is normally installed with a surrounding cement layer 14. In this particular well, it will be assumed that there are no leaks, but such leaks are introduced to describe other aspects of the present method. The numeral 16 identifies a sonde having first and second identical detectors 18 and 20. There are spaced first and second injectors 22 and 24. The sonde 16 is an elongate cylindrical pressure sealed housing which encloses the apparatus on the interior. Signals are provided along an armored logging cable 26 which extends to the surface. The cable can be many thousands of feet in length to enable the sonde to be used in a deep well. The sonde passes over a sheave 28 and is supplied from a spool or drum 30. The logging cable 26 includes one or more signal conductors. They are connected to a signal conditioner circuit at 32 which places the signals in proper format. The signals are output to a CPU 34. The CPU converts the various signals into suitable wave forms as will be discussed. The signals are provided to a recorder 36 which records the signals as a function of depth determined by depth measuring apparatus at 38. That apparatus is normally connected to the sheave to determine the location of the sonde. The measurements to be described herein can be obtained with the sonde suspended at a stationary position or during sonde movement. For purposes of definition, certain terms must be described to assist in understanding of the procedures taught herein. The terms are:

| SYMBOL | DESCRIPTION |
| --- | --- |
| S | Spacing between detector 18 and detector 20, |
| $Q_U$ | Volume flow rate in the upward direction, within the casing |
| $v_U$ | linear flow velocity of the borehole fluid upward, relative to tool velocity, |
| $Q_D$ | Volume flow rate in the downward direction, within the casing |
| $v_D$ | linear flow velocity of the borehole fluid downward, relative to tool velocity, |
| $C_{18}(t)$ | count rate from detector 18 as a function of time, |
| $C_{20}(t)$ | count rate from detector 20 as a function of time, |
| t | time measured from isotope injection at $t_o$, |
| $v_t$ | linear velocity of the tool (negative is downward), |
| A | area of the cased borehole less sonde cross sectional area, |
| $C_{18a}(t)$ | count rate from detector 18, as a function of time, from isotope "a", |
| $C_{20a}(t)$ | count rate from detector 20, as a function of time, from isotope "a", |
| $C_{18b}(t)$ | count rate from detector 18, as a function of time, from isotope "b", |
| $C_{20b}(t)$ | count rate detector 20, as a function of time, from isotope "b", |
| $v_{U,O}$ | linear flow velocity, upward, outside the casing, with respect to tool velocity, |
| $v_{D,O}$ | linear flow velocity, downward, outside the casing, with respect to tool velocity. |

Figure 2:
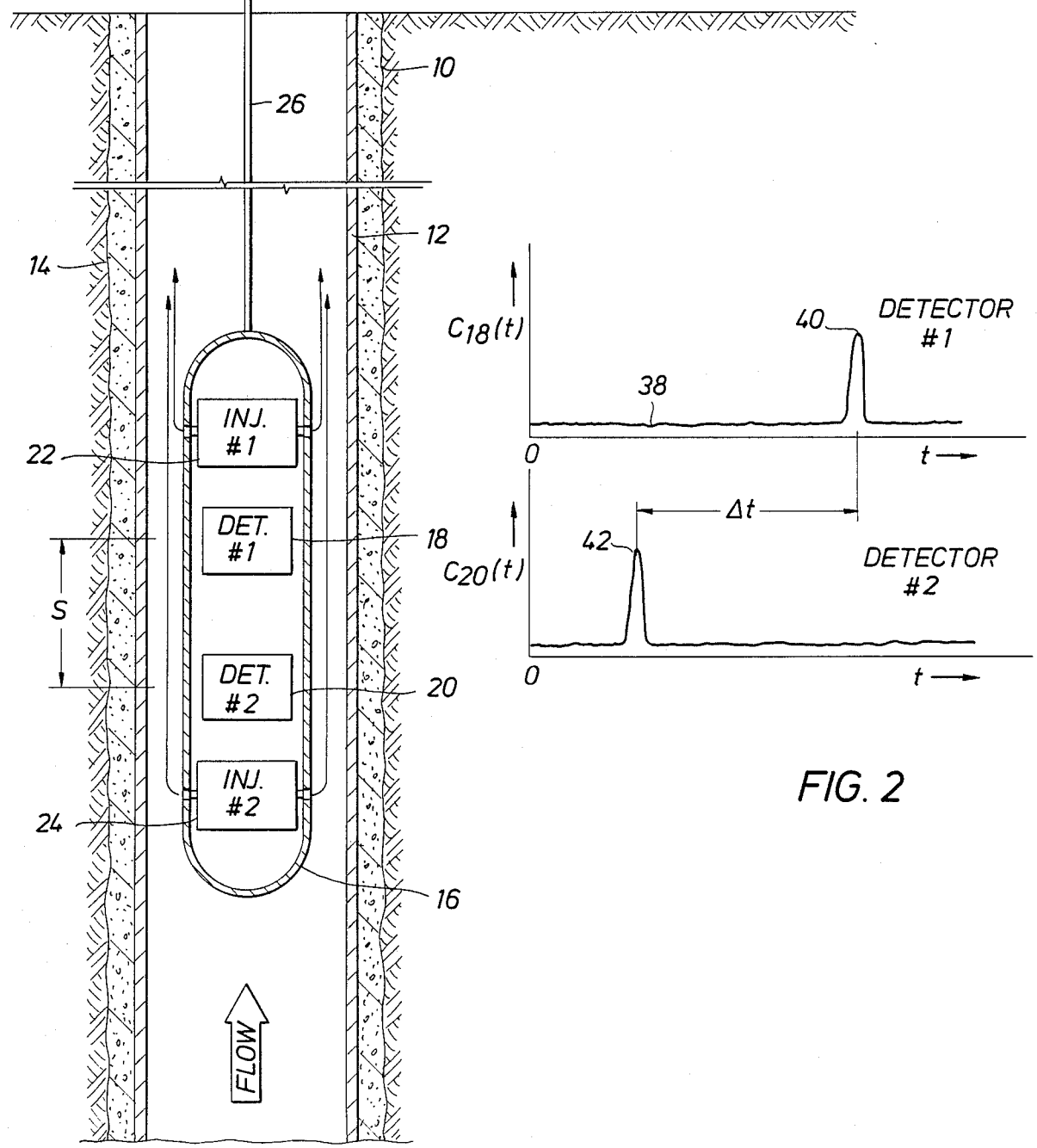
FIG. 2 shows output data from the first and second detectors for determining flow velocity in the situation shown in FIG. 1.

Going now to FIG. 1 of the drawings, assume, for illustration purposes, that the same isotopes are in the injectors 22 and 24. Assume also that at a given time $t_o=0$, both injectors are operated to deliver equal size incremental injections of radioactive isotopes into the flow. The detectors 18 and 20 are operated at that instant and data is recorded as illustrated in FIG. 2. The detectors 18 and 20 form output signals which are shown in FIG. 2. The curve 38 includes the peak at 40 from the detector 18. In similar fashion, the detector 20 provides output data including the peak at 42. The peaks 42 and 40 are separated in time $\Delta t$ which is used in Equation 1 to measure velocity. Equation 1 is:

$$v_u = S/\Delta t \quad (1)$$

Since the distance S is a fixed measure along the sonde 16 between the detectors, the upward velocity can be quickly obtained simply by measuring the elapsed time $\Delta t$ between the peaks 42 and 40. In this instance, the isotope first passes detector 20, as indicated by the peak 42 in $C_{20}(t)$, and then passes the detector 18, as indicated by peak 40 in $C_{18}(t)$. The indicates that the radioactive isotope which is injected from the injector 24 is carried upwardly by the flow. This leads to the conclusion that the flow is upwardly. In that instance, the isotope injected from the topmost injector 22 does not enter into the data collected; that will come into play in other measurements.

Assuming that the sonde is stationary, the upward volume flow rate is $Q_u = Av_u$.

It should be noted that since the velocity and direction of the flow is determined by the time separation and order of occurrence of peaks 42 and 40, it is not necessary that the types of isotopes in injectors 24 and 22 be the same, nor the incremental isotope injections from the injectors 24 and 22 be the same size.

Attention is now directed to FIG. 3 of the drawings which shows the sonde 16 in a well where the flow is in the opposite direction. The direction of flow may not be known at the time the tracer isotopes are injected. Thus, the situation shown in FIGS. 1 or 3 may prevail, and the operator at the surface may not know at the time of injection the direction of flow. Moreover, the definitions given earlier in this disclosure refer to flow measurements relative to tool velocity. In the ordinary case, flow would be upwardly. It is, however, more expedient to move the tool upwardly at a specific velocity, periodically make injections, and thereafter interpret the data. Assume for instance that an injection is made every 500 feet of casing length. Assume that the tool velocity is fixed, injections are made periodically, and the data are collected from the two detectors for each injection. The flow directions causing data outputs shown at FIG. 2 may prevail but it could just as easily be the situation shown in FIG. 4. Thus, in FIG. 3, the tool velocity can be upwardly at a fixed rate, greater than the flow of fluid, and hence the relative fluid velocity is downwardly. Alternatively, the tool can be stationary, and the flow can be downwardly. As before, both injectors are operated simultaneously to inject the radioactive isotopes into the casing, and the isotopes flow relatively upwardly or downwardly as described. Assume that the two detectors provide the curves shown in FIG. 4, the two curves having the peaks at 44 and 46. The time increment $\Delta t$ between the peaks 44 and 46 is used, as in equation (1), to compute the linear flow velocity. The relative position of peaks 44 and 46 with respect to injection time $t_o$ shows that the isotope first passed detector 18 and then detector 20 indicating downward flow. Contrast FIG. 2 with FIG. 4; the peaks are in reversed sequence, indicating that the radioactive isotope injectables have been swept downwardly in FIG. 3 while they flow upwardly in FIG. 1. The relative positions of the peaks with respect to injection time $t_o$ indicate the direction of the flow, and the time increment between the peaks $\Delta t$ is used to calculate the linear flow velocity. Recall also that the measurements of Equation 1 are relative to the tool velocity which can be upward, downward or stationary.

Once flow relative velocity is determined, it is relatively straight forward to determine absolute volume flow rate. Using the example in FIG. 3:

$$Q_D = A(v_D - v_t) \quad (b\ 2)$$

Where $V_t$ is the tool velocity which is algebraically negative in the downward direction.

In the foregoing, Q represents volumetric flow rate, and in this instance, $Q_d$ is in the downward direction. The area A is a fixed value, the net cross sectional area (that is, the area of the cased well minus the cross sectional area of the sonde 16). From the foregoing, it will be observed that tool velocity can be zero by holding the tool stationary whereupon volumetric flow rate is directly proportional to velocity. The same is true in either direction.

THE PROCEDURE IN THE EVENT OF A CASING LEAK

Figure 5:
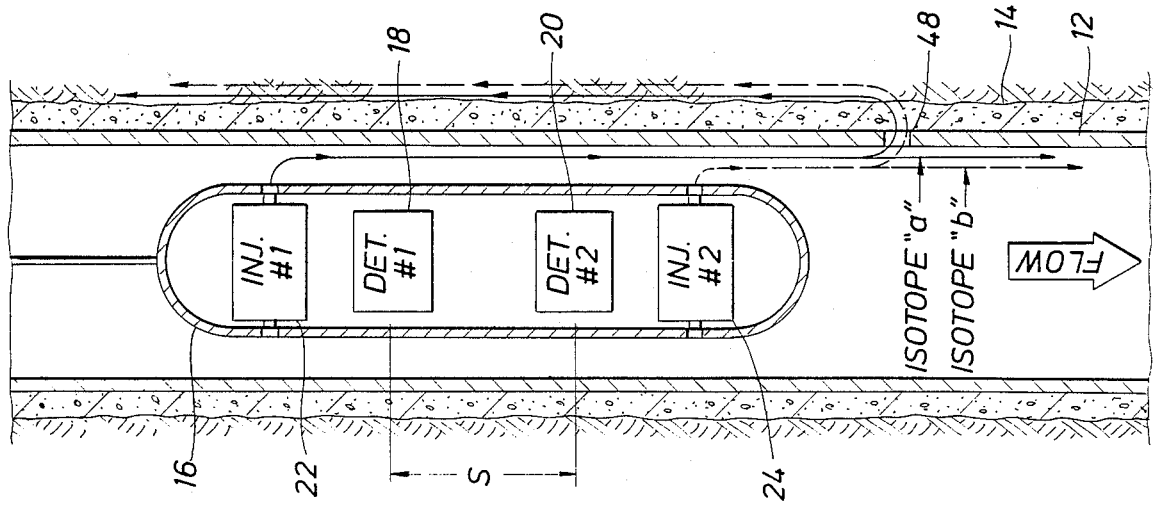
FIG. 5 shows the sonde of FIG. 1 where the flow is in the downward direction, and shows leaks through the casing to the exterior of the casing and flowing in the upward direction.

Attention is now directed to FIG. 5 of the drawings. The same sonde with the same equipment is again used to make the measurements in the same cased well. Here, the well differs only in that there is a hole or perforation 48 which enables flow on the exterior of the cased well.

As shown in FIG. 5, the isotopes are of different types (emitting different gamma ray energies) which are identified as a and b and they are injected into the fluid flow within the cased well borehole. A portion of the injected isotopes flows through the perforation 48 to the exterior of the well. As shown in FIG. 5 of the drawings, the flow is downwardly past the sonde 16 with some portion (somewhere between a small percentage and large portion) flowing through the perforation 48. Typically, the fluid will channel along the exterior of the casing and cement and travel upwardly or downwardly. Flow in the well can be upwardly or downwardly. Flow on the exterior can be upwardly or downwardly.

Figure 6:
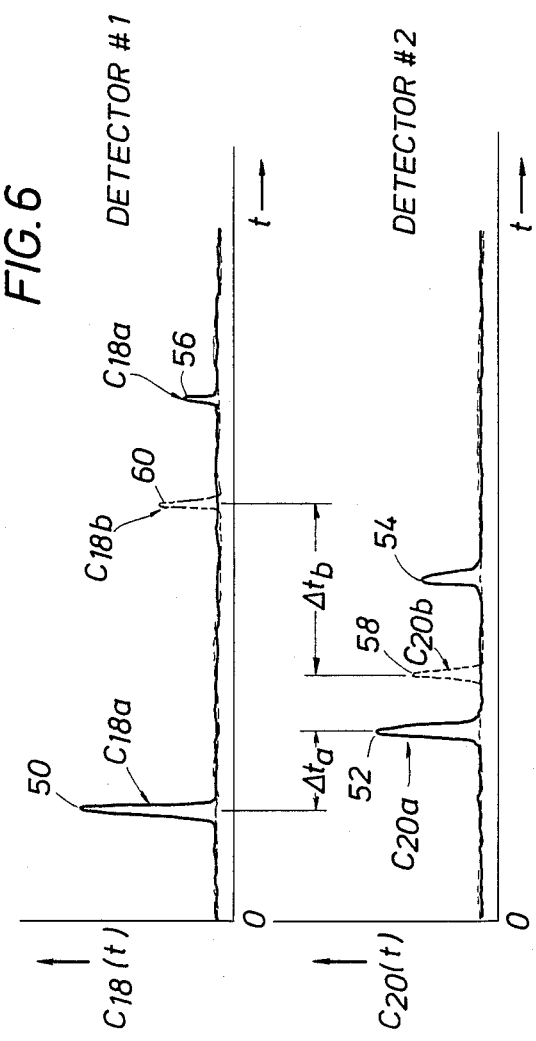
FIG. 6 shows the output of the two detectors and is similar to FIGS. 2 and 4 wherein additional peaks are noted as a result of the upward flow on the exterior of the casing at less velocity than the downward flow in the casing.
Figure 7:
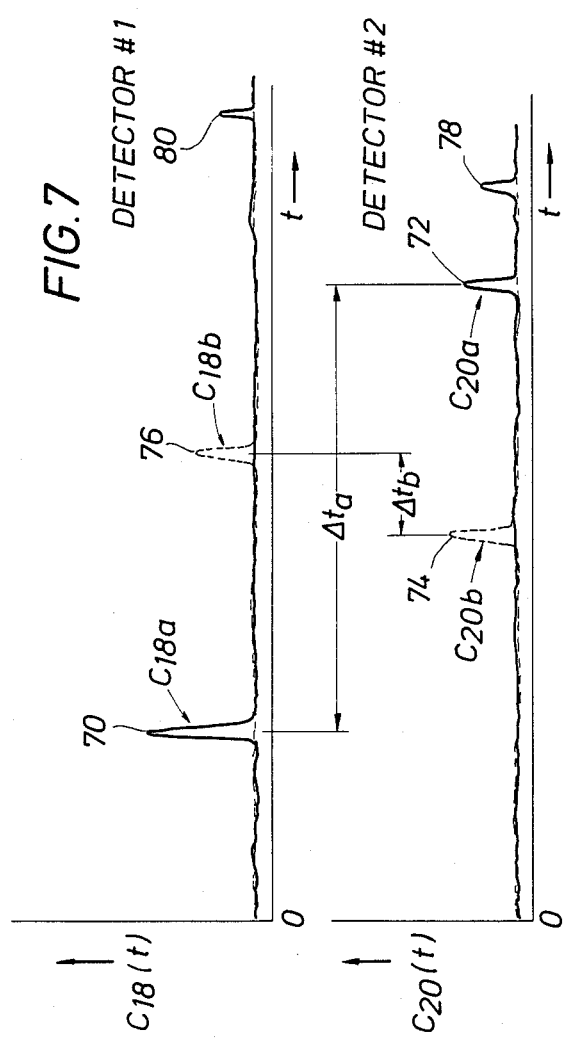
FIG. 7 is similar to FIG. 6 with the upward flow velocity on the exterior of the casing being greater than the downward flow within the casing.

For purposes of definitions to explain the measurements obtained, the foregoing definitions are again used and are applicable to the measurements shown in FIGS. 6 and 7. It may be necessary to relocate the sonde relative to the perforation 48 so that flow is upwardly from the sonde through the perforation 48 and downwardly on the exterior. This depends on the prevailing flow directions both on the inside of the casing and on the exterior. In any event, the apparatus shown in FIG. 5 is operated in the same fashion, namely, both injectors 22 and 24 are simultaneously operated to inject the isotopes a and b respectively at a time where $t_o=0$ and the respective readings from the detectors 18 and 20 are then recorded. The flows and counting rates from isotopes a and b are illustrated by solid and broken lines, respectively. As discussed previously, techniques are used in the detectors 18 nd 20 to delineate response from each isotope.

Assuming that flow is downwardly relative to tool velocity, the first peak observed by the detector 18 is identified at 50 and is derived from the isotope a from the injector 22. The peak 52 is observed at the detector 20 so that the incremental interval $\Delta t_a$ between peaks 50 and 52 is directly related to flow velocity in the casing and the position of these peaks with respect to injection time to $t_o$ indicates downward flow. The two detectors are spaced from one another by the distance S as before and hence, Equation 1 again applies to the computation of linear flow velocity within the casing. On the exterior, that is, flowing along the channel formed outside the casing and/or outside the cement, both isotopes will pass both detectors and form additional peaks in the count rates of both detectors. As shown in FIG. 6, the isotope b, flowing on the exterior of the casing, will travel first past the detector 20 and thereby form the peak 58 and then flow past the detector 18 and form the peak 60. Isotope a will again flow past detectors 20 and 18 creating peaks 54 and 56, respectively. The interval $\Delta t_a$ between the peaks 50 and 52 and the time interval $\Delta t_b$ between the peaks 58 and 60 yield incremental travel times for fluid flow along interior and exterior pathways, respectively. Since all measurements are obtained from the detectors 18 and 20 which are spaced, by the distance S from one another, corresponding linear flow velocities $v_D$ and $V_{u,o}$ can be computed using equation (1). The directions of the flows are again determined by the position of the peaks with respect to injection time $t_o$. FIG. 6 illustrates a case where the velocity is greater in the casing than on the exterior. FIG. 7 is similar to FIG. 6 in that the flow directions are the same but the linear flow velocity of the fluid is greater on the exterior than the interior. Here, the peak 20 corresponds to peak 50. It is measured by the detector 18 as the isotope a flows downward within the casing. The peak 72 occurs much later, and again velocity in the casing is indicated by the incremental time between the peaks 70 and 72. The isotope b arrives at the perforation 48 and begins to move rapidly upward along the external flow channel. It moves into detection range of the detector 20 to form the peak 74 and then rapidly flows past the detector 18 to form the peak 76 before isotope a has flowed past detector 18 in a downward direction. Again, the detectors are at a fixed spacing S, and the time differential between peaks 74 and 76 defines the flow velocity in the outside channel. The peaks 74 and 76 are derived from the isotope b which is detected in the external channel. Ultimately, the isotope a from the top most injector will arrive at the perforation 48 and then travel along the faster channel to again form peaks 78 and 80 at the detectors 20 and 18, respectively. These two peaks should have the same time interval as the time between peaks 74 and 76.

After review of the peaks shown in FIGS. 6 and 7, in light of the flow pattern shown in FIG. 5 (downward flow in the casing and upward in the external channel), it will be understood how the same type of data is obtained where flow within the casing is upward and flow in the external channel is downwardly. By making measurements at multiple depths within the well bore, the above techniques can be used to measure "profiles" of $v_u$, $v_d$, $Q_U$, $Q_D$, $V_{V,O}$, and $V_{D,O}$ as a function of depth.

While the foregoing is directed to the preferred embodiment, the scope thereof is determined by the claims which follow.

What is claimed is:

1. A method of measuring fluid flow velocity along a flowing well comprising the steps of:
   (a) injecting distinguishable first and second fluid soluble radioactive isotopes from a sonde in a well for flow along the well;
   (b) positioning a pair of spaced detectors along the sonde for detection of the isotopes flowing therepast and forming output signals indicative of the flowing isotopes forming past said detectors; and
   (c) locating the points of injection so that one isotope is injected above said detectors and the remaining one is below said detector wherein one of said isotopes flows past said detectors to form output signals indicative of fluid flow velocity.

2. The method of claim 1 wherein said detectors are simultaneously operated and form signal peaks having a time differential dependent on detector spacing and fluid flow velocity.

3. The method of claim 2 wherein the injection of the first and second isotope occurs simultaneously.

4. The method of claim 1 wherein the step of injecting isotopes occurs at a measured depth in the well.

5. The method of claim 1 wherein the step of injecting isotopes occurs while moving the sonde along the well at a measured velocity.

6. The method of claim 1 wherein the well is cased and is tested for a casing leak to the exterior flowing along the exterior of the casing comprising the additional steps of:
   (d) injecting the first and second isotopes so that fluid flow in the well carries the isotopes along the well and through the casing leak to flow along the exterior of the casing;
   (e) operating the first and second detectors to measure from injection time passage of the first and second isotopes while the isotopes flow in the cased well and thereafter while the isotopes flow along the exterior of the casing;

(f) wherein said detectors form peak signals related to fluid flow including peaks formed while the isotopes flow along the exterior of the casing;

(g) selecting peaks associated with flow along the exterior of the casing; and (h) from the selected peaks, measuring time between such peaks to determine external flow velocity.

7. The method of claim 6 wherein the peak signals that are selected include those occurring after initial peaks indicative of fluid flow in the casing.

8. The method of claim 6 wherein the first and second detectors form separate output signals starting at a common time where the common time coincides with isotope injection, and wherein transit time for one of the isotopes as reflected by two separate peaks measured at the two detectors is then determined.

9. The method of claim 8 including the additional step of determining transit time from passage of the second isotope as detected at the two detectors.

10. The method of claim 6 wherein first occurring peaks at both detectors are not used to thereby enable subsequently occurring peaks to provide the external flow velocity.

11. The method of claim 6 including the step of operating two injectors to inject isotopes simultaneously, and thereafter forming output signals from the two detectors, and recording the two signals from injection time.

12. The method of claim 11 wherein injection occurs at $t=0$, and the output signals include peaks indicative of fluid flow along the well.

13. The method of claim 11 wherein injection occurs at $t=0$, and the output signals include peaks indicative of fluid flow exterior of the well.

14. The method of claim 11 including the step of injecting isotopes while moving the sonde at a fixed velocity in the well.

15. The method of claim 11 wherein each detector output signals forms multiple peaks and velocity exterior of the casing is indicated by later occurring peaks in the output signals.

* * * * *